United States Patent
Weems et al.

(10) Patent No.: US 6,264,203 B1
(45) Date of Patent: Jul. 24, 2001

(54) METHODS AND APPARATUS FOR REPAIRING A CRACKED JET PUMP RISER IN A BOILING WATER REACTOR UTILIZING A SPACER CAMP

(75) Inventors: Sterling J. Weems, St. Petersburg; William E. Sylvester, Vero Beach, both of FL (US)

(73) Assignee: MPR Associates, Inc., Alexandria, VA (US)

( * ) Notice: Subject to any disclaimer, the term of this patent is extended or adjusted under 35 U.S.C. 154(b) by 0 days.

(21) Appl. No.: 09/493,129

(22) Filed: Jan. 28, 2000

Related U.S. Application Data
(60) Provisional application No. 60/118,069, filed on Jan. 29, 1999.

(51) Int. Cl.[7] .............................. F16L 21/02; F16L 55/00; B23P 6/00; G21C 19/00
(52) U.S. Cl. ......................... 277/314; 277/603; 277/607; 277/632; 29/402.02; 285/15; 285/420; 376/260; 376/372
(58) Field of Search .................. 29/402.02; 277/314, 277/603, 607, 616, 625, 631, 632, 637; 285/15, 420, 373, 112; 376/260, 372

(56) References Cited

U.S. PATENT DOCUMENTS

| | | | |
|---|---|---|---|
| 1,590,580 | * | 6/1926 | Hume . |
| 3,770,301 | * | 11/1973 | Adams ................................... 285/10 |
| 4,406,481 | * | 9/1983 | Summerell ............................ 285/15 |
| 4,523,763 | * | 6/1985 | Asano et al. ........................... 277/15 |
| 4,572,548 | * | 2/1986 | Porowski et al. ..................... 285/15 |
| 4,575,129 | * | 3/1986 | Porowski ............................... 285/15 |
| 4,927,181 | * | 5/1990 | Ciotola ................................... 285/15 |
| 5,301,983 | * | 4/1994 | Porowski ............................... 285/15 |
| 5,697,650 | * | 12/1997 | Brown ................................. 285/197 |
| 5,735,551 | * | 4/1998 | Whitman et al. ...................... 285/15 |
| 5,839,192 | * | 11/1998 | Weems et al. ......................... 29/723 |
| 5,947,529 | | 9/1999 | Jensen . |
| 6,052,425 | | 4/2000 | Erbes et al. . |
| 6,053,652 | * | 4/2000 | Deaver et al. ......................... 403/24 |
| 6,086,120 | * | 7/2000 | Deaver et al. ....................... 285/420 |
| 6,108,391 | | 8/2000 | Deaver et al. . |

* cited by examiner

*Primary Examiner*—Chuck Y. Mah
*Assistant Examiner*—Vishal Patel

(57) ABSTRACT

A method for repairing cracked jet pump riser assemblies in a boiling water reactor utilizes a spacer clamp and a seal collar. The spacer clamp is secured to the riser assembly to limit horizontal displacement of the riser assembly, and the seal collar is secured around the weld joining the riser elbow and the thermal sleeve to limit leakage from the weld over a predetermined range of horizontal displacement defined by the spacer clamp. A method for repairing a circumferential weld connecting an elbow of a jet pump riser assembly with a thermal sleeve involves positioning the weld within a seal collar and securing the seal collar on the jet pump riser assembly so that seals of the seal collar sealingly contact the elbow and the thermal sleeve, respectively, circumferentially on opposite sides of the weld. A spacer clamp for limiting horizontal displacement between a shroud and a jet pump riser assembly includes inboard and outboard clamp members for seating against the pipe, with the inboard clamp member establishing a gap with the shroud corresponding to a predetermined amount of horizontal displacement allowed between the shroud and the pipe. A seal collar for limiting leakage from a crack in piping of a boiling water reactor includes a pair of hinged jaw members movable between an open position for receiving a pipe therebetween and a closed position encircling the pipe at the location of the crack, and pairs of seals disposed along inner surfaces of the jaw members, respectively, forced into sealing, circumferential contact with the pipe on opposite sides of the crack to limit leakage from the crack.

13 Claims, 5 Drawing Sheets

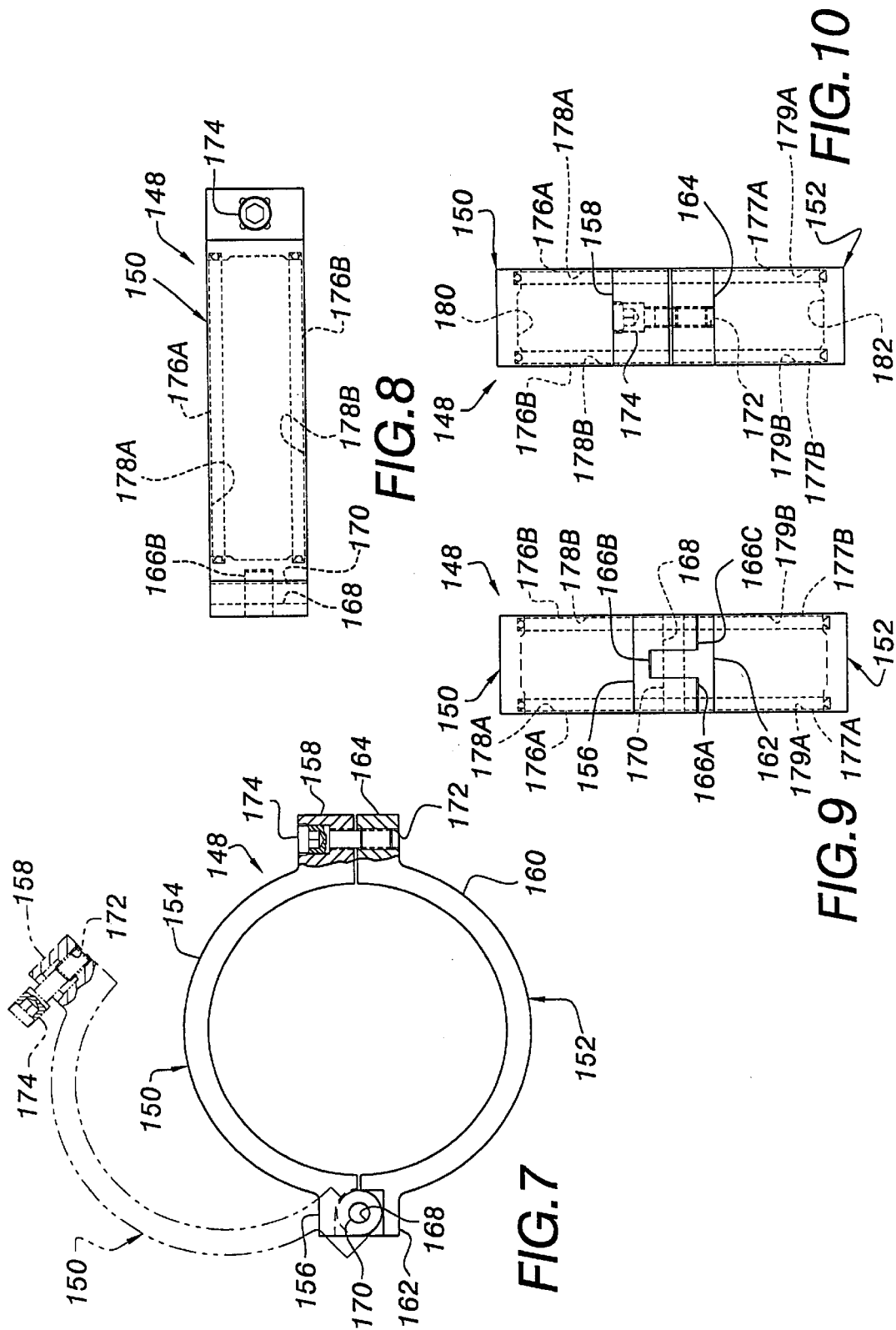

METHODS AND APPARATUS FOR REPAIRING A CRACKED JET PUMP RISER IN A BOILING WATER REACTOR UTILIZING A SPACER CAMP

CROSS-REFERENCE TO RELATED PATENT APPLICATION

This application claims priority from prior provisional patent application Ser. No. 60/118,069 filed Jan. 29, 1999, the disclosure of which is incorporated herein by reference.

BACKGROUND OF THE INVENTION

1. Field of the Invention

The present invention relates generally to boiling water reactors and, more particularly, to methods and apparatus for repairing a cracked jet pump riser in a boiling water reactor.

2. Discussion of the Related Art

A typical boiling water nuclear reactor 10, as illustrated in FIG. 1, includes a reactor vessel 12, a core 14 made up of a plurality of fuel assemblies 16, and a core shroud 18 disposed concentrically within the reactor vessel around the core. Core shroud 18 includes upper and lower cylindrical sections 20 and 22 connected by a horizontal plate or ring 24 extending radially inward from a bottom edge of the upper cylindrical section to a top edge of the lower cylindrical section. A shroud head flange is welded to the top edge of the upper cylindrical shroud section and extends radially inward to support a shroud head or lid 26 of generally hemispherical or dome-shaped configuration, the lid being secured to the top of the shroud with bolts threadedly or otherwise engaged by lugs mounted in angularly spaced relation about the shroud periphery adjacent the top edge of the shroud.

Fuel assemblies 16 are supported at the bottom by a core plate 28 mounted on a core plate support ring or ledge 29, best shown in FIG. 4, extending radially inward from the bottom edge of the lower cylindrical shroud section and at the top by a top guide 30 mounted on horizontal plate 24. Control rod guide tubes 32 are provided within vessel 12 at locations above a control rod driving mechanism extending through nozzles located at the bottom of the reactor vessel beneath the shroud. Lower ends of corresponding control rods are detachably connected to the driving mechanism and are arranged to move up and down within the guide tubes.

Feedwater enters the reactor vessel via a feedwater inlet 34. The feedwater is distributed circumferentially within the reactor vessel by a ring-shaped pipe 36, known as a feedwater sparger, disposed above the shroud and having suitable apertures for circumferentially distributing the feedwater inside the reactor vessel. The feedwater mixes with other water coming from steam separators of the reactor and flows downwardly from feedwater sparger 36 through the downcomer annulus 38, that is, the annular region or space between the reactor vessel and the core shroud, and enters the core lower plenum 40. Boiling is produced in the core creating a mixture of water and steam which enters the core upper plenum, that is, the space under the shroud lid, and is directed into steam plenum heads or stand pipes 46 mounted vertically on the shroud lid in fluid communication with the core upper plenum. The mixture of water and steam flows through stand pipes 46 and enters a respective plurality of steam separators 48, which are shown as being of the axial-flow centrifugal type. The separated liquid water then mixes with incoming feedwater and flows downwardly to the core via the downcomer annulus. The steam, on the other hand, passes through a steam drying assembly or dryer 50 disposed above the steam separators and is withdrawn from the reactor vessel via a steam outlet 52.

Boiling water reactors also include a coolant recirculation system providing the necessary forced convection flow through the core. A portion of the water flowing through the downcomer annulus is withdrawn from the reactor vessel via a recirculation water outlet 42 and is fed under pressure into a plurality of jet pump assemblies 44 distributed circumferentially about the exterior of the core shroud to produce a forced convection flow through the core, thusly providing the required reactor core water flow. Boiling water reactors typically include between six and twelve jet pump assemblies; however, most reactors include ten jet pump assemblies. Referring to FIG. 2, it can be seen that jet pump assemblies 44 are distributed circumferentially about core shroud 18 in annular space 38 between the core shroud and reactor vessel 12. Each jet pump assembly 44 is positioned adjacent a recirculation inlet nozzle 54 formed on the exterior of the reactor vessel and, as best seen in FIGS. 3 and 4, the jet pump assemblies each include a riser assembly 56 extending upwardly from the recirculation inlet nozzle to a transition piece 58, and two inlet mixers 60 extending downwardly from the transition piece to a pair of diffusers 62 mounted over holes (shown in FIG. 1 at 64) in a pump deck 66 connecting a bottom portion of the shroud with the reactor vessel. Riser assembly 56 typically includes a riser pipe 68 oriented vertically in parallel relation to shroud 18 and a riser elbow 70 extending downwardly from the bottom of the riser pipe and bending outwardly to a circumferential weld 72 connecting the elbow with a thermal sleeve 74 in the recirculation inlet nozzle. The riser assembly is supported near the top by a riser brace 76, which is welded to riser pipe 68 and to pads (not shown) on reactor vessel 12 and/or shroud 18. Transition piece 58 extends in opposite directions from the top of riser pipe 68 to connect with inlet mixers 60 on opposite sides of the riser pipe. Inlet mixers 60 extend downwardly from transition piece 58 in parallel relation to riser pipe 68, with lateral support for the inlet mixers being provided by jet pump restrainer brackets 78 attached between respective lower ends of the jet pump inlet mixers and the riser pipe. The entrance or upper end of each inlet mixer 60 is clamped to the riser transition piece 58 by a beam-bolt assembly. The exit or lower end of each inlet mixer 60 forms a slip joint with the entrance or upper end of one of the diffusers 62, the interface between the inlet mixers and the diffusers providing additional lateral support for the riser assembly. The top of the slip joint is located near the bottom of the fuel assemblies; the exact elevation of the slip joint being dependent upon the particular boiling water reactor in question. Diffusers 62 extend downwardly from inlet mixers 60 to pump deck 66 and are of increasing diameter in the downward direction.

The riser elbow is typically a 10-inch diameter, 90 degree radius elbow fabricated of Type 304 stainless steel which, after periods of use, is susceptible to cracking along welded joints. Cracking is particularly common in the heat-affected zone of the weld joining the riser elbow with the thermal sleeve since this weld is typically made in the field and not in a shop where conditions are less likely to result in cracking. Separation of the jet pump riser piping in this area could adversely impact safety in some boiling water reactors under certain accident conditions. When more than one jet pump assembly is affected, the jet pump piping must either be replaced or repaired. Repair is certainly the preferred alternative in view of the fact that replacement involves significant expense, relatively long shut-down time, and the potential for radiation exposure to personnel.

Since weld repairs in the downcomer annulus are typically not practical due to inaccessibility, helium cracking, and the potential for excessive radiation exposure to personnel, a need exists for a method of repairing cracked jet pump riser assemblies involving little or no in-vessel welding.

SUMMARY OF THE INVENTION

Accordingly, it is a primary object of the present invention to provide methods and apparatus for repairing cracked jet pump risers in a boiling water reactor to ensure an adequate flow of water through the reactor core.

It is a more specific object of the present invention to assure continued core flood and low pressure coolant injection in a boiling water reactor having cracked jet pump riser piping.

Another object of the present invention is to limit leakage from cracked jet pump riser piping over a predetermined range of crack widths.

An additional object of the present invention is to limit horizontal displacement of a shroud and jet pump riser assembly to an amount corresponding to a maximum crack width that can be sealed against leakage by a seal collar on the riser assembly.

A further object of the present invention is to limit leakage from cracked jet pump riser piping while allowing maximum shroud displacement.

Yet another object of the present invention is to prevent overstress in the shroud and jet pump riser piping in the event that the riser pipe cracks.

It is also an object of the present invention to limit vertical and tangential displacement of a jet riser assembly to a predetermined range of vertical and tangential displacement.

Some of the advantages of the present invention are that the repair is relatively inexpensive, reactor shut-down time due to the repair is minimized, radiation exposure is negligible for repair personnel, jet pump structural integrity is maintained for normal operation and accident conditions, jet pump response to flow induced vibration and seismic loads is not increased relative to the intact jet pump design, no additional requirements for shroud or diffuser integrity are needed, no special inspections are required, and the repair can be accomplished remotely without disassembling the jet pump assembly or draining significant amounts of reactor water, and the repair involves little or no in-vessel welding or machining.

These and other objects, advantages and benefits are realized with the present invention as generally characterized in a method of repairing a cracked jet pump riser assembly in a boiling water reactor using a spacer clamp and seal collar. The spacer clamp is secured to the riser assembly to limit horizontal displacement of the riser assembly in the direction of the shroud, and the seal collar is secured around a weld of the jet pump riser assembly to limit leakage from the weld over a predetermined range of horizontal displacement defined by the spacer clamp. In a preferred method, the seal collar is secured around the weld joing the riser elbow and the thermal sleeve. The seal collar resists vertical and tangential deflection or displacement of the riser elbow while limiting leakage from a crack in the weld by capturing fluid between a pair of seals disposed on opposite sides of the crack.

The present invention is further generally characterized in a method for repairing a circumferential weld disposed in the annular space between a pressure vessel and a shroud of a boiling water reactor and, in particular, the weld connecting an elbow of a jet pump riser assembly with a thermal sleeve. The weld is positioned through a gap presented between a pair of jaws or collar segments of a seal collar, and the jaws or collar segments are secured together to force pairs of seals of the seal collar into sealing contact with the elbow and thermal sleeve, respectively, on opposite sides of the weld to limit leakage from the weld.

According to the present invention, a spacer clamp for limiting horizontal displacement between a shroud and a pipe disposed in the annular space between the shroud and a pressure vessel of a boiling water reactor includes an outboard clamp member and an inboard clamp member securable on the pipe. The outboard clamp member has an inboard edge contoured to seat against the pipe. The inboard clamp member has an outboard edge contoured to seat against the pipe and has an inboard edge with a radius of curvature commensurate with the radius of curvature of an outer surface of the shroud. When the outboard and inboard clamp members are secured on the pipe, the inboard edge of the inboard clamp member is radially spaced from the outer surface of the shroud by a gap having a width corresponding to a predetermined horizontal displacement allowed between the shroud and the pipe.

In further accordance with the present invention, a seal collar for limiting leakage from a crack in piping of a boiling water reactor is generally characterized in a collar including a pair of arcuate jaw members having hinged ends, respectively, pivotally connected to one another and having unhinged ends, respectively, first and second pairs of seals disposed along inner surfaces of the jaw members, respectively, at corresponding locations, and a securing member adapted to secure the collar in a closed position on the pipe. The collar is movable between an open position wherein the unhinged ends are spaced from one another to define a gap therebetween for receiving the pipe and the closed position wherein the unhinged ends are in abutment such that the collar encircles the pipe at the location of the crack. The seals of each jaw member are laterally spaced from one another across a width of the jaw member to be disposed on opposite sides of the crack, with ends of the first pair of seals in abutment or adjacent ends of the second pair of seals, when the collar encircles the pipe. The securing member, when used to secure the collar in the closed position on the pipe, forces the seals into sealing contact with the pipe on opposite sides of the crack to limit leakage from the crack.

Other objects and advantages of the present invention will become apparent from the following description of the preferred embodiments taken in conjunction with the accompanying drawings, wherein like parts in each of the several figures are identified by the same reference numerals.

BRIEF DESCRIPTION OF THE DRAWINGS

FIG. 7 is a side view of a seal collar according to the present invention.

FIG. 8 is a top view of the seal collar shown in FIG. 7.

FIG. 9 is a rear view of the seal collar shown in FIG. 7.

FIG. 10 is a front view of the seal collar shown in FIG. 7.

DESCRIPTION OF THE PREFERRED EMBODIMENTS

The methods and apparatus of the present invention are described hereinafter for use in repairing the weld joining a jet pump riser elbow with a thermal sleeve in the jet pump recirculation system of a boiling water reactor. It will be appreciated, however, that the methods and apparatus according to the present invention can be used to repair welds joining other components of the jet pump recirculation system as well as other piping in the boiling water reactor.

Figure 1:
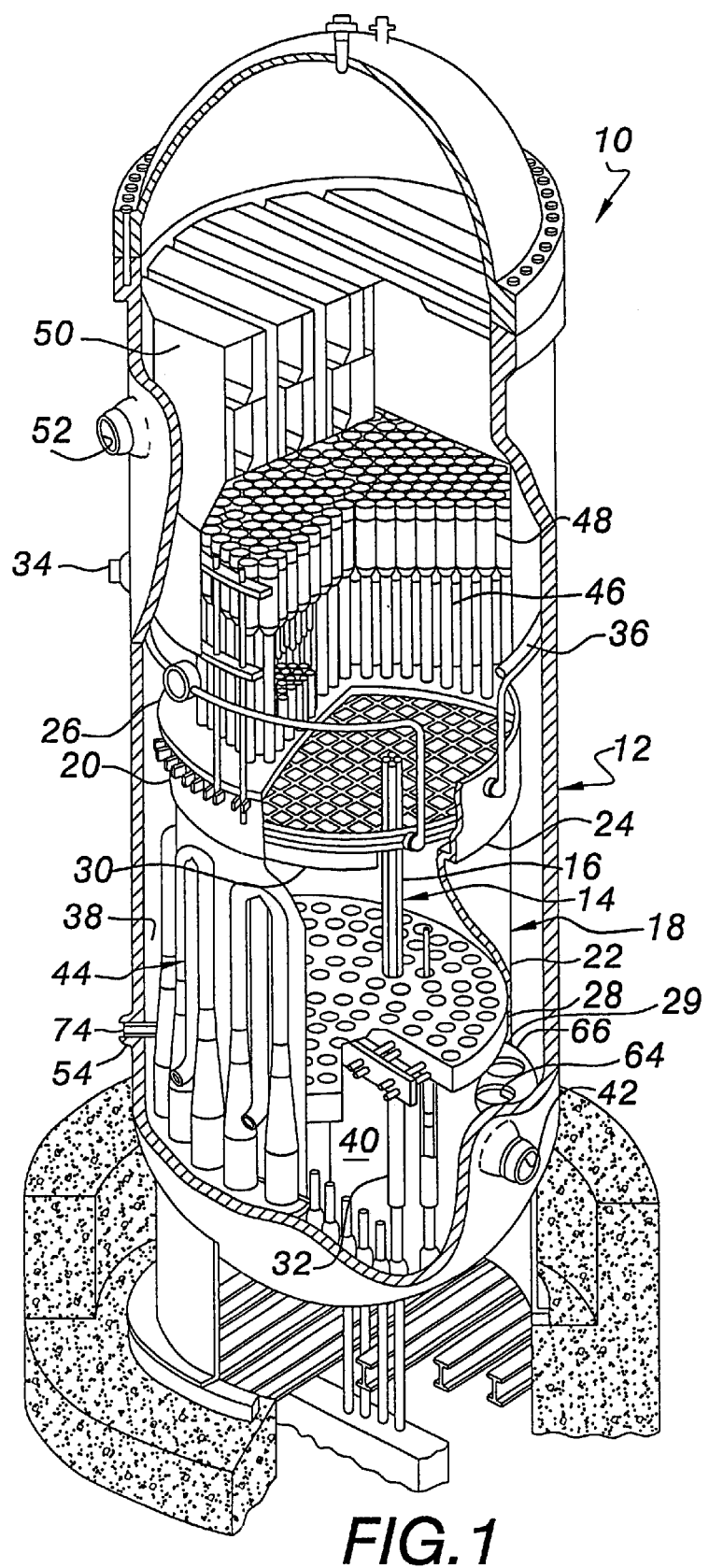
FIG. 1 is a cut away view in perspective of a boiling water reactor exemplifying a type of reactor suitable for repair by the methods and apparatus of the present invention.
Figure 2:
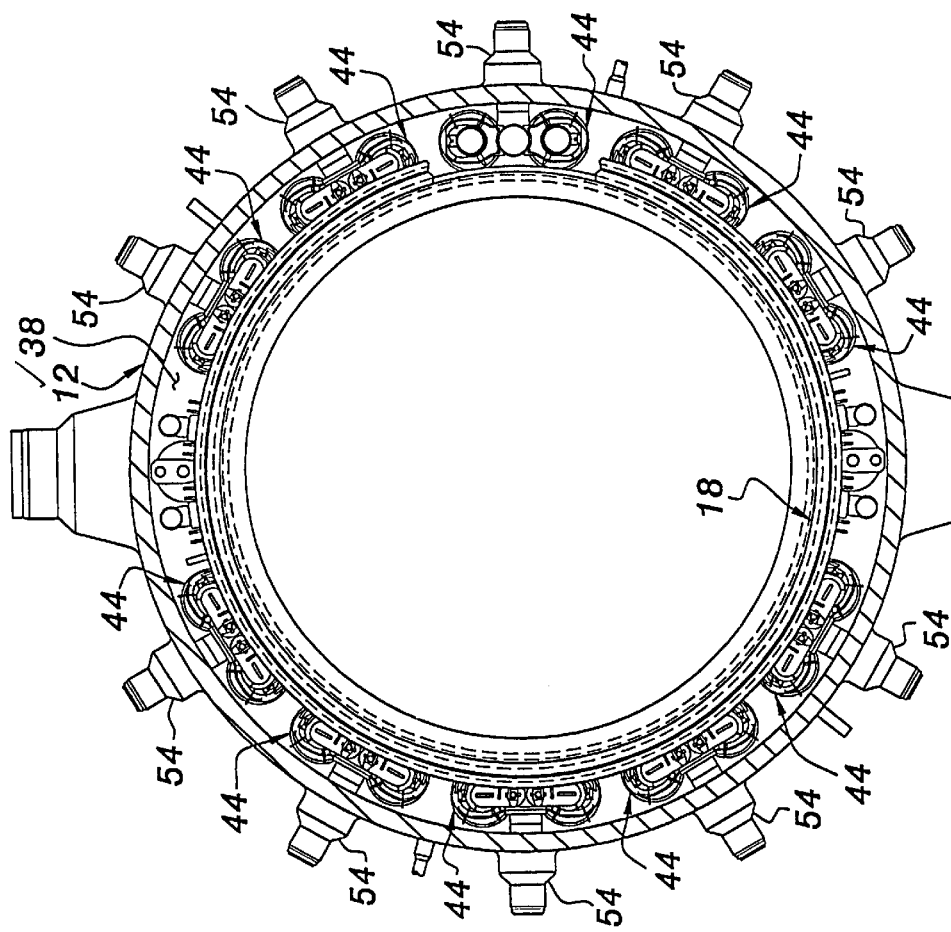
FIG. 2. is a top View, partly in section, of a boiling water reactor illustrating the arrangement of jet pump assemblies in the annular space between the core shroud and the reactor vessel.
Figure 3:
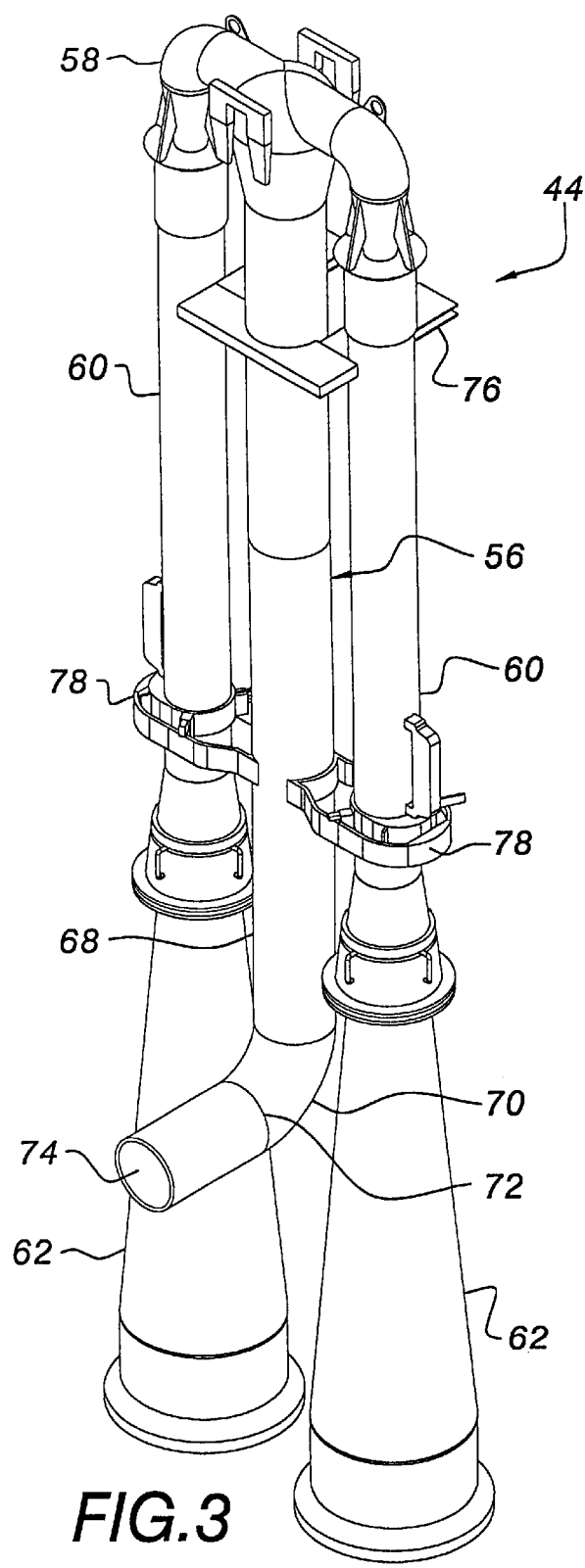
FIG. 3 is a perspective view of a jet pump assembly of a type commonly used in a boiling water reactor.
Figure 4:
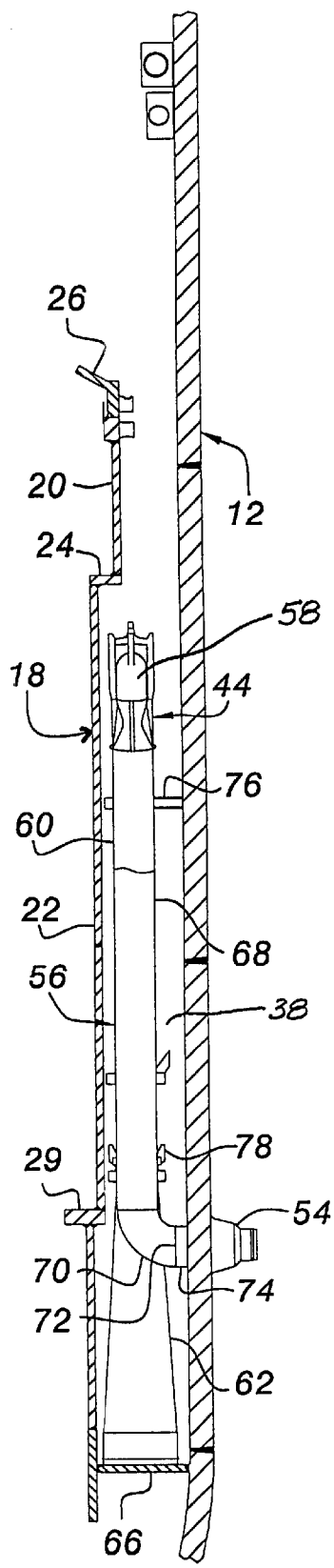
FIG. 4 is a fragmentary side view, partly in section, of a boiling water reactor illustrating the position of a jet pump assembly relative to the core shroud and the reactor vessel.
Figure 6:
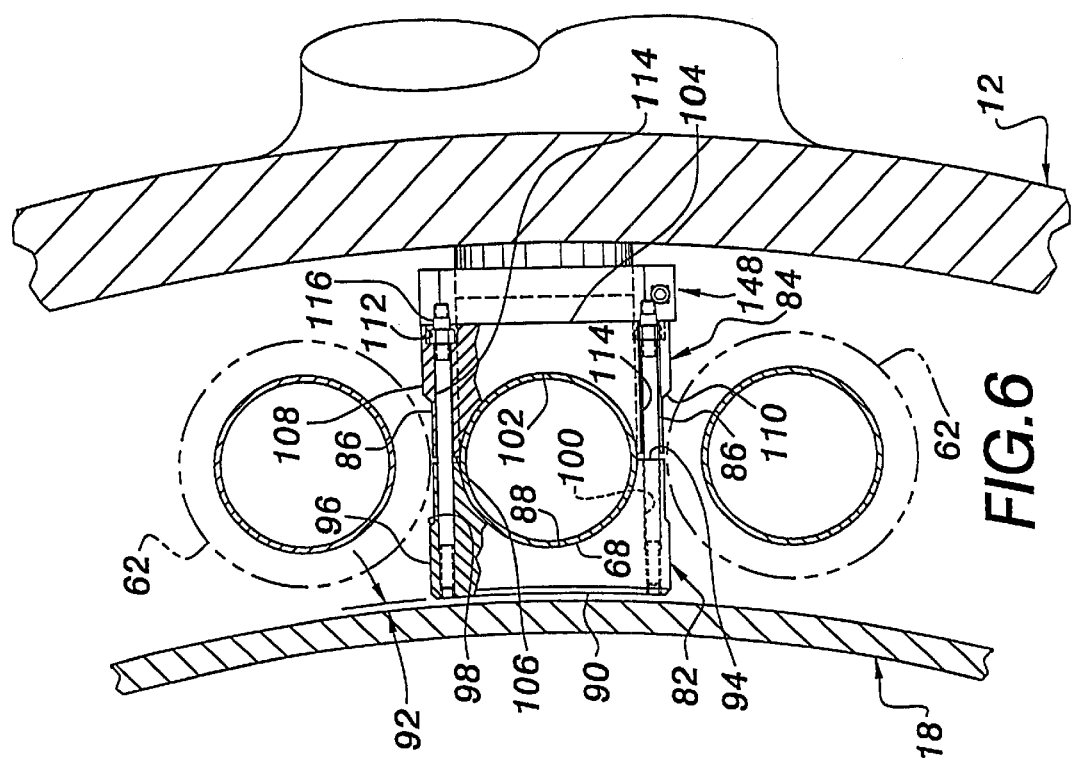
FIG. 6 is a fragmentary top view, partly in section, illustrating a spacer clamp according to the present invention.
Figure 5:
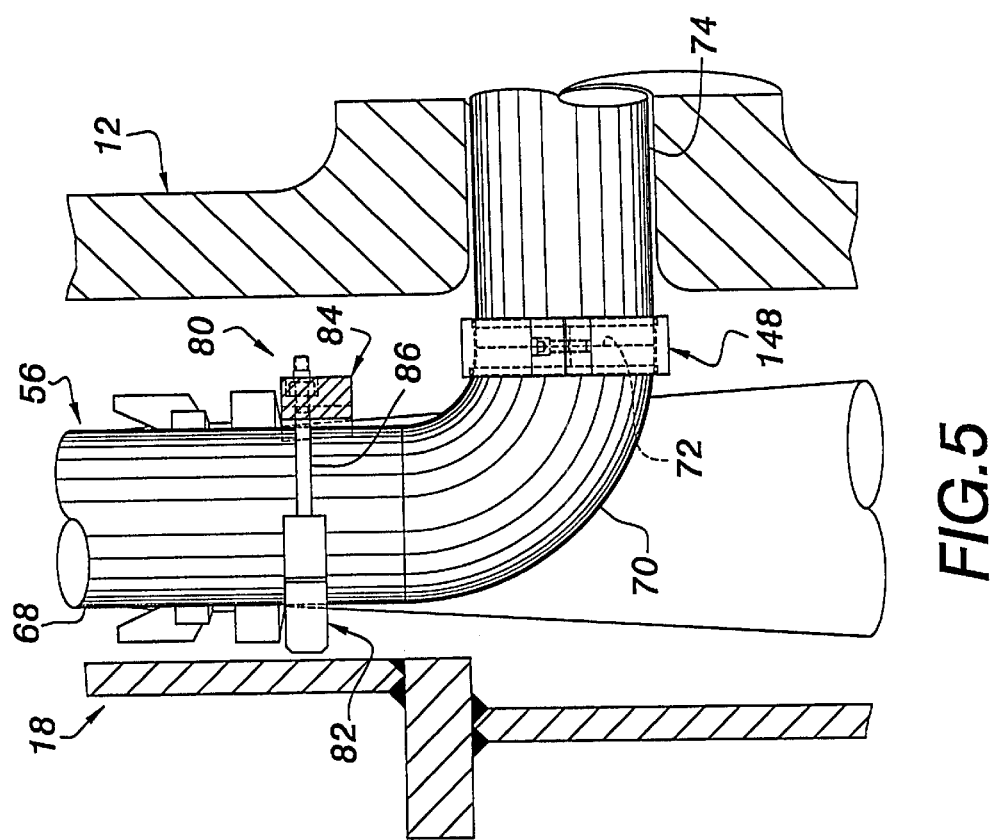
FIG. 5 is an enlarged fragmentary side view, partly in section, of a boiling water reactor illustrating a jet pump riser repair according to the present invention.

In accordance with the present invention, as illustrated in FIGS. 5 and 6, a spacer clamp 80 is secured to riser assembly 56 to limit horizontal displacement of the riser assembly in the direction of shroud 18, and a seal collar 148 is secured around weld 72 joining riser elbow 70 and thermal sleeve 74 to limit leakage from weld 72 over a predetermined range of horizontal displacement defined by the spacer clamp. Spacer clamp 80 includes first and second clamp members or jaws 82 and 84 disposed on opposite sides of riser pipe 68 and connected by one or more threaded fasteners 86. Clamp member 82, which may be considered an inboard clamp member, extends in an inboard direction from an outboard edge with a concavely curved outboard surface 88 contoured to seat against the riser pipe to an inboard edge with a concavely curved inboard surface 90 radially spaced from shroud 18, the concavely curved inboard surface having a radius of curvature commensurate with the radius of curvature of the outer surface of the shroud to establish a uniform gap 92 between the inboard edge of the clamp member 82 and the shroud. Curved outboard surface 88 extends about half-way around the circumference of riser pipe 68, and the outboard edge of clamp member 82 further includes a pair of flat surfaces 94 that extend laterally outward from opposite ends of the curved outboard surface to the lateral edges 96 of the inboard clamp member. As best seen in FIG. 6, lateral edges 96 are spaced to fit between jet pump diffusers 62 when the spacer clamp is installed, and the lateral edges extend in the inboard direction past the diffusers. Optionally, the lateral edges 96 form a lateral step or shoulder 98 where the spacing between the lateral edges is increased to increase the length of the inboard edge and, thus, the surface area of concavely curved inboard surface 90 such that stresses on the riser pipe and the shroud are minimized in the event the spacer clamp contacts the shroud. A pair of threaded openings or holes 100 extend in a generally inboard direction through clamp member 82 on opposite sides of riser pipe 68 to receive threaded ends of fasteners 86.

Clamp member 84, which may be considered an outboard clamp member, is similar to clamp member 82 but extends in an outboard direction from an inboard edge with a concavely curved inboard surface 102 contoured to seat against riser pipe 68 to a generally straight and flat outboard edge or surface 104 spaced from an inner surface of reactor vessel 12. Curved inboard surface 102 extends about half way around the circumference of riser pipe 68, and a pair of generally straight and flat surfaces 106 extend laterally outward from opposite ends of the curved inboard surface to lateral edges 108 of the clamp member. Lateral edges 108 extend in an outboard direction past diffusers 62. Optionally, the lateral edges 108 form a step or shoulder 110 where the spacing between the lateral edges is increased. A pair of slots 114 are formed in a top surface of clamp member 84 on opposite sides of riser pipe 68 and extend in a generally outboard direction from flat surfaces 106 to counterbores 112 formed in outboard surface 104.

Fasteners 86 are shown as threaded rods, each of which includes a first threaded end which is threaded into one of the openings 100 formed in clamp member 82 and a second threaded end which extends through one of the slots 114 in clamp member 84 to receive a nut 116 in counterbore 112.

Seal collar or clamp 148 is installed around weld 72 between riser elbow 70 and recirculation inlet nozzle thermal sleeve 74 to resist vertical and tangential deflection or displacement of the riser elbow as well as to limit leakage from weld 72 over a predetermined range of horizontal displacement defined by spacer clamp 80 as explained further below. As best seen in FIGS. 7–10, seal collar 148 includes a pair of arcuate clamping members, jaws or collar segments positionable to encircle a pipe. In the case of seal collar 148, the clamping members, jaws or collar segments are hinged clamping members, jaws or collar segments 150 and 152 movable between an open position allowing the clamp to be placed around a pipe and a closed position encircling the pipe. Clamping member, jaw or collar segment 150, which is an upper jaw in FIG. 7, includes an arcuate medial portion 154 configured to extend circumferentially around a portion of the pipe and a pair of straight end portions 156 and 158 that extend radially outward from opposite ends of the arcuate portion. Clamping member, jaw or collar segment 152, which is a lower jaw in FIG. 7, includes an arcuate medial portion 160 configured to extend circumferentially around the remaining portion of the pipe and a pair of straight end portions 162 and 164 that extend radially outward from opposite ends of the arcuate portion. End portions 156 and 162, which may be considered hinged ends of the jaws, are slotted to define interleaved hinge elements or fingers 166A–C, and a through-hole 168 is formed perpendicularly through the interleaved hinge elements to receive a pin 170 allowing the jaws to pivot relative one another between the closed position shown by solid lines in FIG. 7 and the open position shown by broken lines in FIG. 7. End portions 158 and 164, which may be considered unhinged or free ends of the jaws, abut one another in the closed position, and a threaded hole 172 is formed through the end portions to receive a securing member or bolt 174 so that the jaws can be locked in the closed position around the pipe.

Jaws 150 and 152, which may be called first and second jaws, respectively, are shown having a generally rectangular cross-sectional configuration with a width (e.g., about 4 inches) to fit in the gap between the riser pipe and the reactor vessel. As best seen in FIGS. 8–10, a first pair of deformable metal seals 176A and 176B of arcuate configuration are disposed within annular grooves 178A and 178B, respectively, extending circumferentially around the inner surface 180 of arcuate portion 154. A second pair of deformable metal seals 177A and 177B of arcuate configuration are disposed within annular grooves 179A and 179B, respectively, extending circumferentially around the inner surface 182 of arcuate portion 160. Seals 176A and 176B are laterally spaced across the width of jaw 150, and seals 177A and 177B are laterally spaced the same amount across the width of jaw 152. Seal 176A has its ends adjacent or in abutment with the ends of seal 177A to be circumferentially continuous with seal 177A when the seal collar is in the closed position. Seal 176B has its ends adjacent or in abutment with the ends of seal 177B to be circumferentially continuous with seal 177B when the seal collar is in the closed position. Also, seals 176A and 177A are disposed on an opposite side of the crack from seals 176B and 177B when the seal collar is installed around weld 72 as shown in FIGS. 5 and 6 to contain leakage from the crack over a predefined range of horizontal separation between the riser elbow and thermal sleeve and, therefore, over a predefined range of crack widths.

The jet pump repair method according to the present invention includes shutting down the reactor, removing any reactor internals which may impede access to the jet pump assemblies, and installing a spacer clamp and seal collar. It is not necessary to drain reactor water below the riser elbow to perform the repair. This minimizes radiation exposure to repair personnel by maintaining a sufficient water level above the more highly radioactive areas of the reactor (i.e., nearest the reactor fuel) to act as shielding.

One method of installing spacer clamp 80 involves lowering outboard clamp member 84 into the annular space between reactor vessel 12 and shroud 18 using long-handled tools and positioning the clamp member against the outboard side of riser pipe 68 in a horizontal position with slots 114 facing upwardly as shown in FIGS. 5 and 6. Fasteners 86 are threaded into openings 100 of inboard clamp member 82 and nuts 116 are loosely threaded onto outboard ends of the fasteners to form an inboard clamp member assembly. Clamp member 82 is then rotated 90° such that fasteners 86 protrude vertically upward therefrom, and the inboard clamp member assembly is lowered into the annular space between reactor vessel 12 and shroud 18 using long handled tools. When inboard clamp member 82 is at about the same elevation as outboard clamp member 84, the inboard clamp member is pivoted downwardly in the direction of riser pipe 68 into a horizontal position such that fasteners 86 are received within the slots formed in the top surface of the outboard clamp member. Fasteners 86 protrude in an outboard direction from the slots in clamp member 84, with nuts 116 disposed outwardly of the clamp member to facilitate positioning of the fasteners within the slots. Once positioned, clamp members 82 and 84 are secured to riser pipe 68 by tightening nuts 116 until they are received within counterbores 112 formed in the outboard surface of clamp member 84. Counterbores 112 are formed sufficiently below the top surface of clamp member 84 to prevent upward movement of the nuts and, thus, the fasteners, once the nuts are threaded into the counterbores. In the installed condition or state, shown in FIGS. 5 and 6, spacer clamp 80 extends from riser pipe 68 in the inboard direction to the inboard surface or edge 90 which is radially spaced from the shroud to define the gap 92. The gap has a width between the inboard surface of the inboard clamp member and the outer surface of the shroud, the gap width corresponding to a predetermined amount of lateral or horizontal displacement allowed between the shroud and the riser pipe assembly, for example during a seismic or recirculation pipe break accident.

Seal collar 148 can be installed prior to, during or after installation of a spacer clamp. For minor cracking, use of a seal collar may provide adequate control of leakage such that a spacer clamp is not needed. One method of installing the seal collar involves lowering the collar into the space between the riser pipe and the reactor vessel in an open position, as shown by broken lines in FIG. 7, with bolt 174 threaded in upper jaw 150. In the open position, unhinged end portions 158 and 164 of the upper and lower jaws are separated by a gap large enough to receive the pipes making up the jet pump riser assembly. As a result, collar 148 can be positioned around the junction between the riser elbow and thermal sleeve by orienting the gap to face the pipes and moving the collar toward the pipes until they are received between the upper and lower jaws. Jaws 150 and 152 are then pivoted toward one another about the hinge formed by end portions 156 and 162 until straight end portions 158 and 164 at the unhinged end abut one another in the closed position shown by solid lines in FIG. 7. Deformable metal seals 176A and 177A are now disposed on a side of the junction opposite the side of the junction at which the seals 176B and 177B are disposed and, therefore, on opposite sides of a crack arising from the welded joint between the riser elbow and thermal sleeve. The bolt 174 is threaded into the hole 172 in the unhinged end of jaw 152 and tightened to force the deformable seals into sealing contact with the pipes on opposite sides of the crack. If desired, the bolt may be locked in place using conventional methods. The bolt 174 may be introduced into the space between the riser pipe and the reactor vessel subsequent to or simultaneously with the seal collar 148.

Although the clamping members, jaws or collar segments 150 and 152 are shown as hinged jaws, it should be appreciated that the clamping members, jaws or collar segments 150 and 152 can be provided as unhinged collar segments separately positioned around the junction between the riser elbow and thermal sleeve as described for inboard and outboard clamp members 82 and 84. Accordingly, the pin 170 or other securing member or fastener can be inserted through the hole 168 subsequent to positioning of the collar segments around the piping, or the pin 170 or other securing member or fastener can be disposed in one of the end portions 156 or 162 prior to introduction of the corresponding collar segment in the reactor vessel.

In operation, seal collar 148 resists vertical and tangential deflection or displacement of the riser elbow and limits leakage from the crack, even if it opens, by capturing fluid between the deformable seals. Dependent upon the spacing between the deformable seals, seal collar 148 can continue to capture fluid leaking from the weld over a range of crack widths. The spacer clamp 80 does not transfer loads to the diffusers. Spacer clamp 80 defines a gap 92 which limits horizontal displacement of the shroud and the riser assembly to an amount corresponding to the maximum crack width for which seal collar 148 can capture fluid. In an exemplary embodiment, gap 92 is preferably between about 1 and about 2 inches so that seal collar 148 will still be positioned around the weld and will limit leakage even if the weld crack becomes parted by about 1 to 2 inches of displacement of the riser pipe in the inboard direction. The 1 to 2 inch gap allows shroud displacement, for example during a seismic or recirculation pipe break accident, and is also sufficient to allow the maximum displacement of a shroud as limited for other reasons, such as control rod alignment. Accordingly, the gap is sufficient to accommodate worst case shroud displacement, even for a failed and repaired shroud and even during accident events. The clamp members are configured to seat against the riser pipe and shroud to prevent overstress of the riser pipe or shroud if the pipe weld cracks. Also, the seal collar 148 limits vertical and tangential displacement of the jet pump riser to a predetermined range of vertical and tangential displacement. The spacer clamp does not result in any requirements for shroud integrity or inspections that are not already required for other reasons (even if the shroud welds are cracked and repaired).

The spacer clamp and seal collar can be fabricated from any high-strength material suitable for use in a boiling water nuclear reactor including, but not limited to, solution annealed and rapid quenched Type 304 or 316 stainless steel. The various bolts and fasteners can be fabricated from any suitable materials including, but not limited to, the above materials and annealed XM-19 to provide resistance to galling. The seals can have any suitable configuration and can be fabricated from any suitable materials including, but not limited to, 0.375 inch cross-sectional diameter O-rings formed of Inconel X750.

From the above, it will be appreciated that the jet pump riser repair according to the present invention limits leakage from cracks in the riser welds to ensure an adequate flow of water through the reactor core. The repair makes use of a spacer clamp which is secured to the jet pump riser assembly to limit horizontal displacement of the shroud and the riser pipe assembly, and a seal collar which is secured around the weld joining the riser elbow and the thermal sleeve to limit leakage from the weld over a predetermined range of horizontal displacement defined by the spacer clamp. Both the spacer clamp and the seal collar can be installed in the annular space between the core shroud and reactor vessel without welding.

The gap defined by the spacer clamp can be varied dependent upon the spacing between the seals of the seal collar. While a uniform gap is shown, it will be appreciated that the spacer clamp can define a gap which varies across the width of the clamp. Any number of parts can be used in fabricating the spacer clamp. For example, one, two, or more than two clamp members can be secured to the riser assembly along the riser pipe or any other part of the assembly. When multiple clamp members are used, the clamp members can be disposed on inboard and outboard sides of the riser pipe as shown, between the riser pipe and jet pump diffusers, or at any other location relative to the riser pipe. If desired, the spacer clamp can be held in place using a bias member such as a spring disposed between the clamp and the shroud or between the clamp and the riser pipe. While fasteners in the form of threaded rods with nuts are shown, it will be appreciated that other types of fasteners can be used including, but not limited to, bolts, pins and bias members such as springs. Slots can be formed in any clamp member to facilitate insertion of fasteners during installation. Furthermore, such slots can be formed on any side of the clamp member. If desired, the spacer clamp can include a member which extends in an outboard direction from the shroud to an outboard edge or surface spaced from the riser assembly to define a suitable gap. The spacer clamp and, in particular, the gap established therewith, allows the riser pipe and/or the shroud to be laterally displaced a total or cumulative amount corresponding to the gap width. When the riser pipe and/or shroud are displaced an amount corresponding to the gap width, the inboard edge of the inboard clamp member seats against the outer surface of the shroud.

The seal collar can be hinged at one end as shown and described above or held together with bolts on each end. The jaws of the seal collar can be configured to move in any manner relative to one another to define a gap or opening for receiving the pipe including, but not limited to, configurations wherein the jaws pivot, slide, twist, or move telescopically relative to one another. In the closed position, the jaws of the seal collar define an arcuate inner surface extending circumferentially around the weld joining the riser elbow and the recirculation inlet nozzle thermal sleeve. The outer surfaces of the jaws are also shown as being generally arcuate but can have any configuration to fit between the riser pipe and reactor vessel. While pairs of axially spaced seals are shown, any number of seals can be used. The seals can be formed of a deformable metal or any other material providing a reliable seal in a reactor environment. The inner surface of one or both jaws can be keyed to mate with slots or key ways formed in the piping (e.g., using EDM techniques) so that the seal collar can carry axial loads normally carried by the cracked weld.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method for repairing cracked jet pump riser assemblies disposed in the annular space between a pressure vessel and a shroud of a boiling water reactor, said method comprising the steps of lowering inboard and outboard clamp members, respectively, into the annular space;

positioning the inboard and outboard clamp members on opposite sides of a riser pipe of a jet pump riser assembly;

fastening the inboard and outboard clamp members to the riser pipe such that a gap is presented between the inboard clamp member and the shroud corresponding to a predetermined range of horizontal displacement between the jet pump riser assembly and the shroud;

lowering a seal collar into the annular space;

positioning the seal collar over a crack in a circumferential weld between an elbow of the jet pump riser assembly and a thermal sleeve; and tightening the seal collar such that leakage from the crack is limited over a predetermined range of crack widths corresponding to the predetermined range of horizontal displacement.

2. The method for repairing cracked jet pump riser assemblies as recited in claim 1 wherein said step of lowering includes lowering the outboard clamp member into the annular space and thereafter lowering the inboard clamp member into the annular space.

3. The method for repairing cracked jet pump riser assemblies as recited in claim 2 wherein said step of positioning includes positioning the outboard clamp member against an outboard side of the riser pipe and thereafter positioning the inboard clamp member against an inboard side of the riser pipe.

4. The method for repairing cracked jet pump riser assemblies as recited in claim 3 wherein said step of positioning the inboard clamp member includes/pivoting the inboard clamp member in the direction of the riser pipe.

5. The method for repairing cracked jet pump riser assemblies as recited in claim 4 wherein said step of fastening includes fastening the inboard and outboard clamp members together with fasteners disposed on opposite sides of the riser pipe.

6. The method for repairing cracked jet pump riser assemblies as recited in claim 1 wherein said step of lowering a seal collar includes lowering the seal collar into the annular space with the seal collar in an open position wherein hinged jaws of the seal collar have unhinged ends, respectively, separated by a gap.

7. The method for repairing cracked jet pump riser assemblies as recited in claim 6 wherein said step of positioning the seal collar includes positioning the crack in the circumferential weld through the gap of the seal collar and thereafter moving the seal collar to a closed position wherein the unhinged ends of the jaws are in abutment.

8. The method for repairing cracked jet pump riser assemblies as recited in claim 7 wherein said step of tightening includes securing the unhinged ends together.

9. The method for repairing cracked jet pump riser assemblies as recited in claim 8 wherein said step of tightening includes inserting a securing member into the unhinged ends.

10. The method for repairing cracked jet pump riser assemblies as recited in claim 8 wherein said step of lowering a seal collar includes lowering the seal collar into the annular space with a securing member disposed in one of the unhinged ends and said step of tightening includes inserting the securing member into the other of the unhinged ends.

11. The method for repairing cracked jet pump riser assemblies as recited in claim 8 wherein said step of positioning the seal collar includes positioning pairs of seals of the seal collar on opposite sides of the crack in the circumferential weld.

12. The method for repairing cracked jet pump riser assemblies as recited in claim 11 wherein said step of tightening includes forcing the seals into sealing contact with the elbow and thermal sleeve, respectively.

13. The method for repairing cracked jet pump riser assemblies as recited in claim 1 wherein said step of lowering a seal collar includes lowering separate collar segments of the seal collar into the annular space, said step of positioning includes positioning the collar segments to encircle the weld such that pairs of seals of the seal collar are disposed on opposite sides of the crack in the weld and said step of tightening includes securing ends of the collar segments together to force the seals into sealing contact with the elbow and thermal sleeve, respectively.

* * * * *